(12) United States Patent
Jo

(10) Patent No.: US 9,930,311 B2
(45) Date of Patent: Mar. 27, 2018

(54) SYSTEM AND METHOD FOR ANNOTATING A VIDEO WITH ADVERTISING INFORMATION

(71) Applicant: Inha Industry Partnership Institute

(72) Inventor: Geun Sik Jo, Songdo-dong (KR)

(73) Assignee: Geun Sik Jo, Icheon (KR)

( * ) Notice: Subject to any disclaimer, the term of this patent is extended or adjusted under 35 U.S.C. 154(b) by 76 days.

(21) Appl. No.: 13/867,489

(22) Filed: Apr. 22, 2013

(65) Prior Publication Data

US 2014/0140680 A1 May 22, 2014

(30) Foreign Application Priority Data

Oct. 20, 2011 (KR) ........................ 10-2011-0107272
Dec. 12, 2012 (KR) ........................ 10-2012-0144305

(51) Int. Cl.

| H04N 7/10 | (2006.01) |
|---|---|
| H04N 7/025 | (2006.01) |
| H04N 9/87 | (2006.01) |
| H04N 5/445 | (2011.01) |
| H04N 21/41 | (2011.01) |
| H04N 21/431 | (2011.01) |
| H04N 21/45 | (2011.01) |
| H04N 21/4725 | (2011.01) |
| H04N 21/81 | (2011.01) |

(Continued)

(52) U.S. Cl.
CPC ........... *H04N 9/8715* (2013.01); *G06Q 30/02* (2013.01); *H04N 5/445* (2013.01); *H04N 21/25891* (2013.01); *H04N 21/2668* (2013.01); *H04N 21/4126* (2013.01); *H04N 21/4307* (2013.01); *H04N 21/4316* (2013.01); *H04N 21/4348* (2013.01); *H04N 21/4532* (2013.01); *H04N 21/4725* (2013.01); *H04N 21/812* (2013.01); *H04N 21/47815* (2013.01)

(58) Field of Classification Search
CPC combination set(s) only.
See application file for complete search history.

(56) References Cited

U.S. PATENT DOCUMENTS

| 7,752,642 B2 * | 7/2010 | Lemmons .......... H04N 7/17318 725/32 |
| 7,870,592 B2 * | 1/2011 | Hudson ........................ 725/102 |

(Continued)

FOREIGN PATENT DOCUMENTS

| KR | 1020120008589 B1 | 4/2013 |
| KR | 1020120006601 A | 7/2013 |

*Primary Examiner* — Alexander Gee
(74) *Attorney, Agent, or Firm* — Madeline F. Schiesser; Keohane & D'Alessandro, PLLC

(57) ABSTRACT

Embodiments of the present invention provide a client terminal (e.g., user terminal or advertiser terminal) for displaying a video annotated with advertisement information. Specifically, among other things, embodiments of the present invention provide a client terminal including a video player module configured to receive video based on a user request. The client terminal also further includes an advertising information search module configured to receive an advertising information overlay. The client terminal further includes an advertising information display module configured to simultaneously display the requested video and the advertising information overlay on a display of the user terminal.

20 Claims, 13 Drawing Sheets

(51) Int. Cl.
*G06Q 30/02* (2012.01)
*H04N 21/258* (2011.01)
*H04N 21/2668* (2011.01)
*H04N 21/43* (2011.01)
*H04N 21/434* (2011.01)
*H04N 21/478* (2011.01)

(56) References Cited

U.S. PATENT DOCUMENTS

| | | | |
|---|---|---|---|
| 8,312,486 B1 * | 11/2012 | Briggs | H04N 21/435 725/32 |
| 2007/0250901 A1 | 10/2007 | McIntire et al. | |
| 2009/0006937 A1 | 1/2009 | Knapp et al. | |
| 2009/0165041 A1 * | 6/2009 | Penberthy et al. | 725/34 |
| 2009/0327894 A1 | 12/2009 | Rakib et al. | |
| 2010/0088716 A1 * | 4/2010 | Ellanti et al. | 725/32 |
| 2010/0325666 A1 * | 12/2010 | Wiser | H04N 7/17336 725/44 |
| 2011/0247042 A1 * | 10/2011 | Mallinson | G06F 17/30026 725/86 |
| 2012/0066066 A1 * | 3/2012 | Jain et al. | 705/14.58 |
| 2012/0084812 A1 * | 4/2012 | Thompson | H04N 21/25891 725/34 |
| 2012/0177067 A1 * | 7/2012 | Cho | H04N 21/4126 370/503 |
| 2013/0036011 A1 * | 2/2013 | Roberts | G06Q 30/0251 705/14.58 |

\* cited by examiner

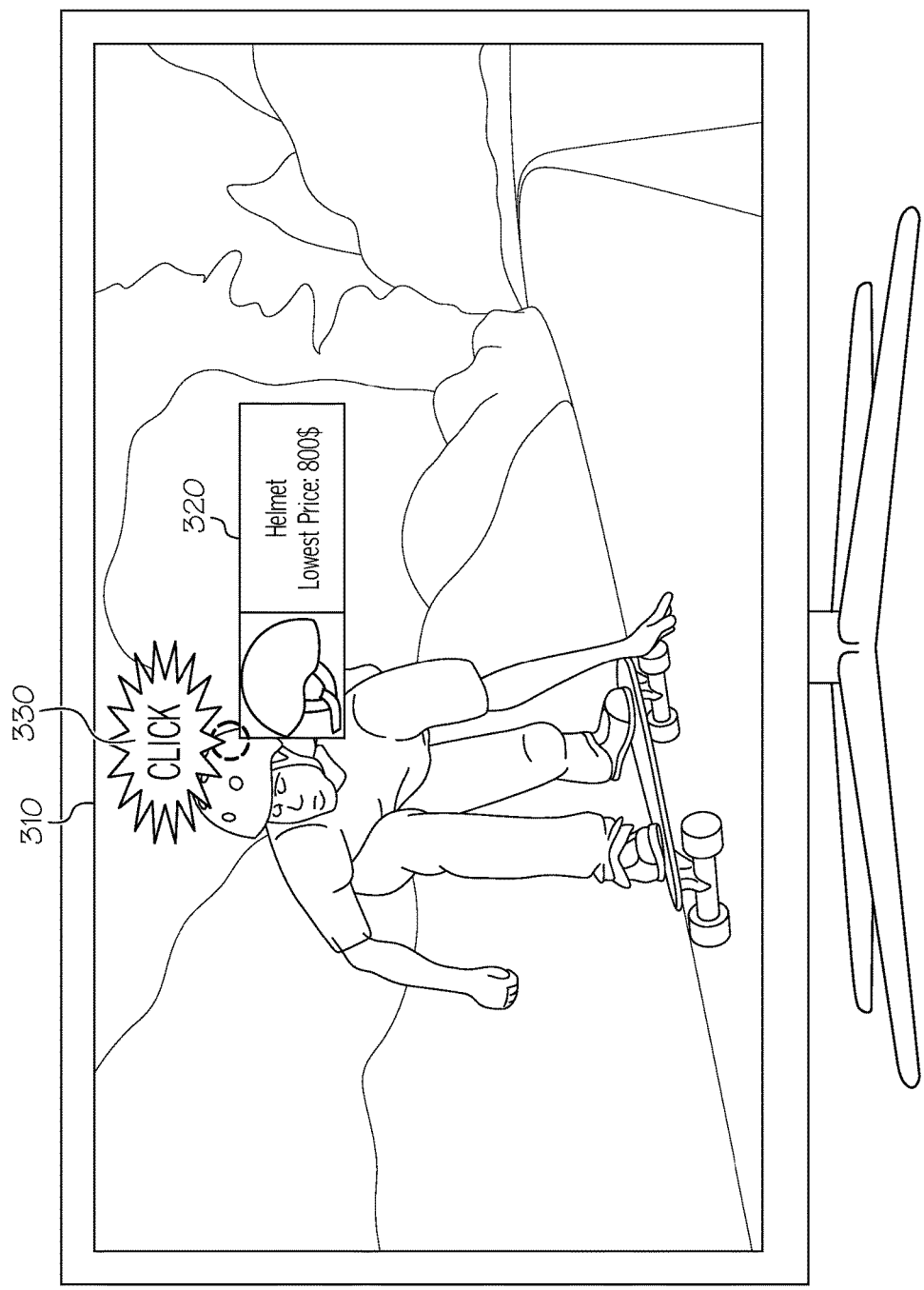

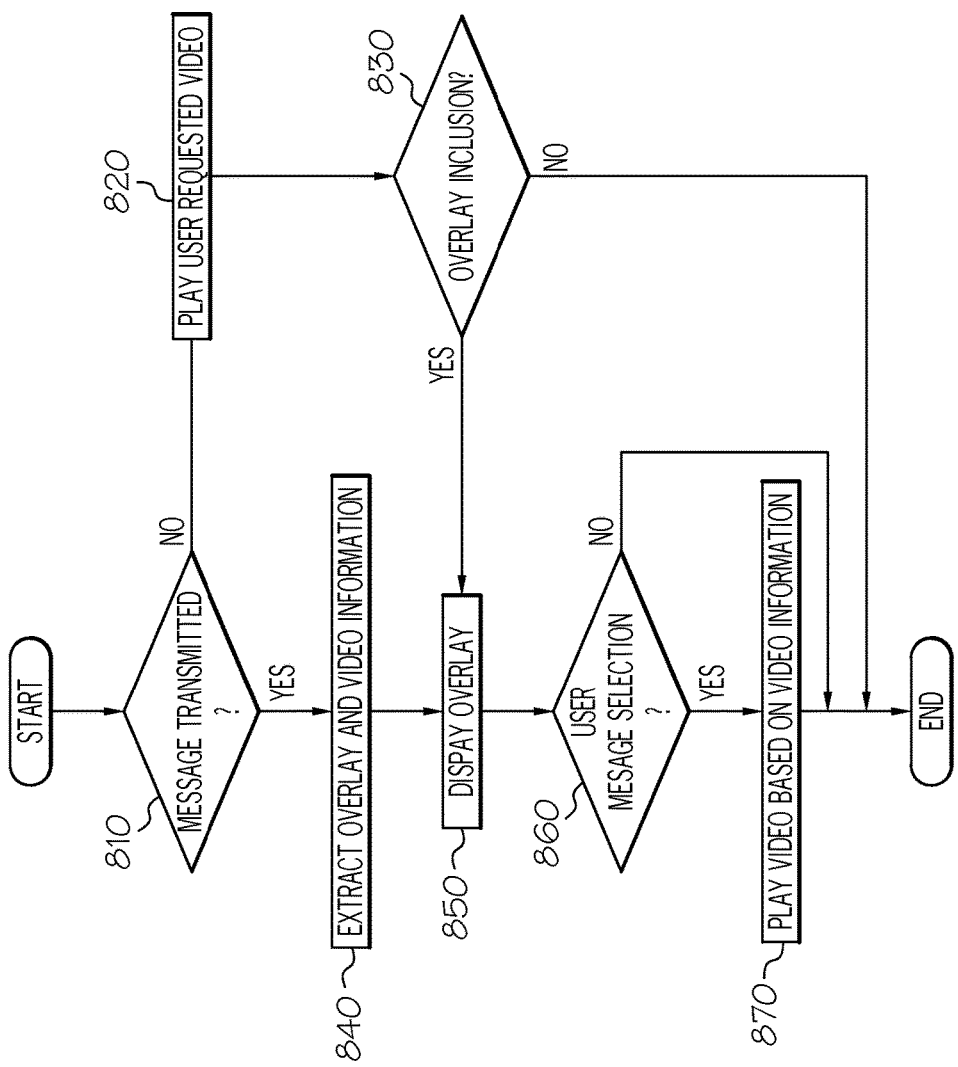

SYSTEM AND METHOD FOR ANNOTATING A VIDEO WITH ADVERTISING INFORMATION

CROSS-REFERENCE TO RELATED APPLICATION

This application claims the priority benefit of Korean Patent Application No. 10-2011-0107272, filed on Oct. 20, 2011, and Application No. 10-2012-0144305, filed on Dec. 12, 2012, in the Korean Intellectual Property Office, the disclosure of which is incorporated herein by reference.

TECHNICAL FIELD

Embodiments of the present invention relate generally to annotating video playback. Specifically, the present invention relates to delivery of advertising information by annotating video playback with enhanced video objects.

BACKGROUND

Advertising has become a pervasive part of our society. Since the 1950's when television (TV) was introduced on a mass scale to television viewing households, advertisers have been provided the ability to address and deliver advertising content to TV audiences. However, by the mid-2000's, as the Internet grew to hundreds of millions of users worldwide, and technology became faster and more efficient, a new smart client devices industry began to emerge with devices being connected (sometimes wirelessly) to the Internet, changing how many people view video content.

Advertisers seek to capitalize on this new industry by looking for ways to incorporate advertisements into a user's interaction with a smart client device. In the past, advertisements were strictly one-way communication. For example, if a user is interacting with a smart client device while viewing video content (either a TV broadcast or via the Internet), there exists the opportunity to provide an advertisement to the user that is coordinated with the presentation and the video content. Items appearing with celebrities and models in video content are working as indirect marketing methods. However, even if users are interested in a particular item, problems arise as to how a user may find more information about the item or purchase it.

SUMMARY

In general, embodiments of the present invention provide a client terminal (e.g., user terminal or advertiser terminal) for displaying a video annotated with advertisement information. Specifically, among other things, embodiments of the present invention provide a client terminal including a video player module configured to receive video based on a user request. The client terminal also further includes an advertising information search module configured to receive an advertising information overlay. The client terminal further includes an advertising information display module configured to simultaneously display the requested video and the advertising information overlay on a display of the user terminal.

A first aspect of the present invention provides a client terminal for displaying a video annotated with advertisement information, comprising: one or more processors, memory, or a display; a video player module configured to receive video based on a user request; an advertising information search module configured to receive an advertising information overlay; and an advertising information display module configured to display the advertising information overlay with the requested video.

A second aspect of the present invention provides a method for displaying a video annotated with advertisement information on a user terminal, comprising: receiving video based on a user request; receiving an advertising information overlay; and displaying the advertising information overlay with the requested video on a display of the user terminal.

BRIEF DESCRIPTION OF THE DRAWINGS

These and other features of this invention will be more readily understood from the following detailed description of the various aspects of the invention taken in conjunction with the accompanying drawings in which:

FIGS. 3A-E depict illustrations of advertising information according to embodiments of the present invention.

FIG. 8 depicts a method flow diagram of a process for displaying advertising information according to an embodiment of the present invention.

Figure 1:
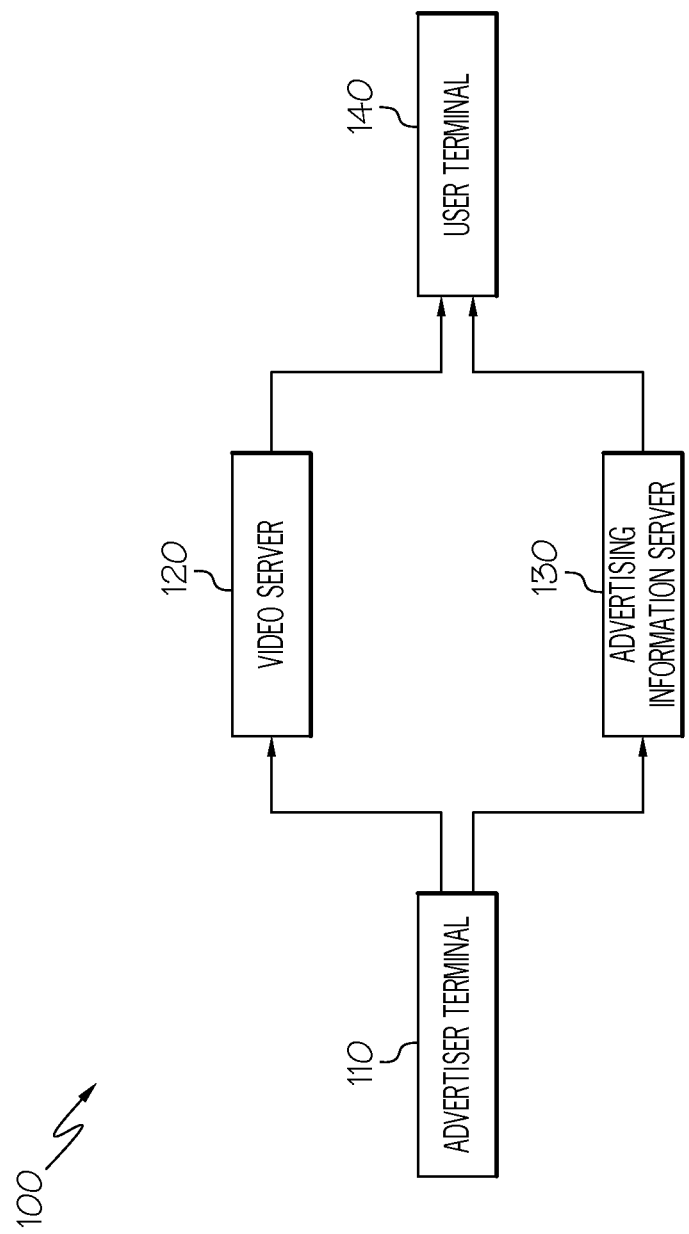
FIG. 1 depicts an advertising information system according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide a user terminal for displaying a video annotated with advertisement information. Specifically, among other things, embodiments of the present invention provide a user terminal including a video player module configured to receive video based on a user request. The user terminal further includes an advertising information search module configured to receive an advertising information overlay. The user terminal further includes an advertising information display module configured to simultaneously display the requested video and the advertising information overlay on a display of the user terminal.

FIG. 1 depicts an advertising information system 100 according to an embodiment of the present invention. Advertising information system 100 may include advertiser terminal 110, video server 120, advertising information server 130 and user terminal 140. User terminal 140 may include, but is not limited to, a multimedia Internet-enabled cellular telephone, Internet-enabled television, Internet-enabled personal computer, or similar electronic device which is Internet-enabled and may include a programmable processor or dedicated graphics processing chip, memory, and a display.

The advertiser terminal 110 may generate an advertising information overlay (overlay) to be displayed with a corresponding user requested video from the video server 120. The advertiser terminal 120 may generate the overlay to be displayed with a requested video, a portion of the video (e.g., one or more scenes), or one or more visual objects within the video. The overlay may be in the form of (among other things) text, video, one or more images, music, or one or more three-dimensional (3D) objects. The overlay may be related to a particular product and include (among other things) product name, description, advertiser, and/or price.

The advertiser terminal 120 may then transmit the generated overlay to the advertising information server 130. Moreover, the advertiser terminal 120 may transmit the requested video as well as an advertising information message to the user terminal 140 of a user targeted by the advertiser. The advertising information message transmitted by the advertiser terminal 120 may at least include one of the following: video recognition information, video start time, video run time, website address related to the advertising information video, advertising information, video scene, or scene relating to the advertising information.

The video server 120 may be a server containing multiple videos and, based on a request from the advertiser terminal 110 or user terminal 140, may provide the requested video. The advertising information server 130 may store and manage the overlay transmitted from the advertiser terminal 110. The advertising information server 130 may include target user distinction information which group targets users selected by the advertiser, as well as video distinction information which may tell if a particular video is relevant to the advertising information (i.e., overlay) written by the advertiser. When the user terminal 140 displays a video relevant to an overlay, the advertising information server 130 may transmit the overlay to the user terminal 140 based on the user terminal request.

The advertising information server 130 may distinguish whether a particular terminal belongs to a user targeted by the advertiser who may be exposed to the overlay. If not, the overlay may be blocked. For example, the advertiser may dictate video 1's advertising information generation to be exposed to a target group. When a user terminal belonging to a user of different group searches the advertising information (or overlay) related to video 1, advertising information server 130 may distinguish that the terminal is different from the one included in the target group using target group distinction information. As such, the advertising information server 130 may respond with no search results to a terminal belonging to a user of a different target group. In this case, the user terminal of another group may display video 1 without any overlay.

Conversely, when a user terminal 140 of a user belonging to a targeted group searches the advertising information related to video 1 from advertising information server 130, the advertising information server 130 may confirm the terminal belongs to a targeted user using target group distinction information. In this case, the advertising information server 130 may transmit the overlay related to video 1 to the user terminal 140. The user terminal 140 may overlap overlay onto video 1, effectively synchronizing the overlay transmitted from advertiser terminal 110 with video related to overlay from video server 120.

The user terminal 140 may play a video from video server 120 based on a user request. The user terminal 140 may search for advertising information (i.e., overlay) related to the video from advertising information server 130. When searching for the overlay related to the video from advertising information server 130, the user terminal may overlap the overlay onto the video or may display the overlay on another area of the screen. If the user is not a targeted user, the user terminal 140 may not display the overlay. Moreover, the user terminal 140 may display a message from the advertiser terminal 110 to the user.

When a user selects (e.g., by mouse click, touch, or other means) an overlay included in the message, the user terminal 140 may play the video that advertiser terminal 110 is playing using information contained in the message. At this time, the user terminal may either be a single device or multiple devices. For example, the user may simultaneously watch the video on a smart TV and smart phone. Moreover, the user may transmit the message on the smart phone, and when selecting advertising information included in message, may also watch the video on smart TV. At this time, the smart phone (set up as a user terminal) may transmit video distinction information to the smart TV (also set up as a user terminal), effectively allowing the smart TV to play the video.

By overlaying advertising information in the form of an overlay onto a requested video (e.g., video scene or visual object), advertising information is provided to the user along with the requested video.

Figure 2:
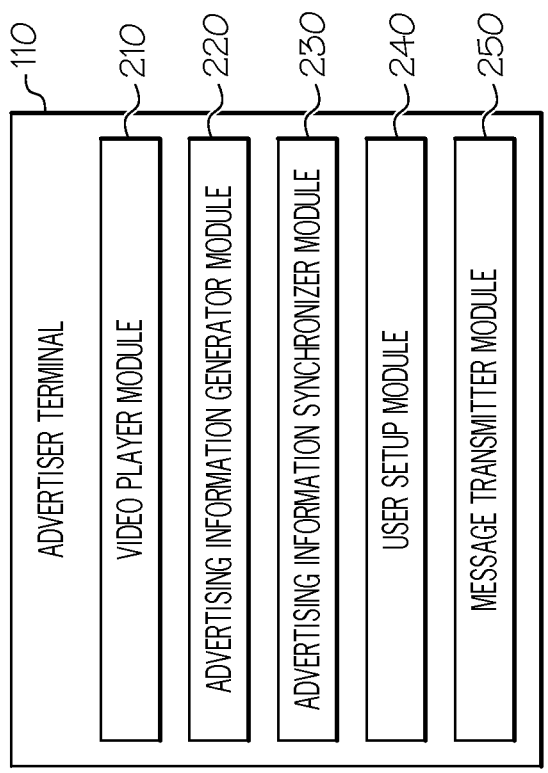
FIG. 2 depicts a schematic of an advertiser terminal according to an embodiment of the present invention.

FIG. 2 depicts a schematic of an advertiser terminal according to an embodiment of the present invention. As shown, the advertiser terminal 110 includes video player module 210, advertising information generator module 220, advertising information synchronizer module 230, user setup module 240, and message transmitter module 250. The term "module" may be defined to include one or more executable modules. As described herein, the modules are defined to include software, hardware, or some combination thereof executable by a processor or processing device. Software modules may include instructions stored in the storage device that are executable by the processor or processing device. Hardware modules may include various devices, components, circuits, gates, circuit boards, and the like, that are executable, directed, and/or controlled for performance by the processor or processing device.

Video player module 210 may play a video based on a user request. Specifically, it receives data pertaining to particular video such as the video title or other search criteria related to the user request. The video player module 210, by using the data received, may search for the requested video in video server 120. Subsequently, video player module 210 takes the requested video from video server 120 and plays it, either by downloading or streaming it live.

The advertising information generator module 220 may generate an advertising information overlay related to the requested video. In one example, the advertising information overlay (overlay) may correspond to one or more visual objects (e.g., products) shown in the requested video. In other examples, the overlay may be associated with the requested video in another way. The advertising information generator module 220 may generate the overlay based on the entire requested video, one or more video scenes of the requested video, or one or more video objects displayed in the requested video. To accomplish this, the advertising information generator module 220 may receive advertisement display data needed to generate the overlay from the advertiser. The advertisement display data may include, but is not limited to, product advertisement information, data associated with the requested video (such as one or more visual objects within the requested video that may be associated with the overlay), display time associated with the product advertisement information, a display location associated with the product advertisement information, and a uniform (or universal) resource locator (URL) of a website associated with the advertised product.

As the requested video plays, the advertising information generator module 220 may track the movements of one or more visual objects within the requested video and, according to the movements, may move the display location of the overlay. In other words, the advertising information generator module 220 may determine a first location of a visual object that is associated with an overlay. It may display the overlay based on the location of the visual object (e.g., next to or near the visual object). When the visual object moves, the advertising information generator module 220 may generate a second location of the visual object and display the overlay based on the second location. This process keeps ensures the overlay is continually displayed near the associated visual object. For example, the advertiser may wish to generate an advertising information overlay for a particular visual object in the requested video. The advertiser may input the movement route of the visual object, and the advertising information generator module 220 may set up an overlay in a way to track the visual object's movement route. Moreover, advertising information generator module 220, throughout the advertising display time, may distinguish visual objects and, based on location of a visual object at a given time, dictate the location of the overlay being displayed.

The advertiser may signal the first appearance of a visual object having an overlay and the advertising information generator module 220 may track the visual object after the video frame of its first appearance and, by sampling the movement route through all the video frames, may effectively track the movement route of the visual object from start to finish. A video frame is one of the many still (or nearly so) images which compose the complete requested video. In one example, the advertising information generator module 220 may determine the movement route of a visual object from start to finish and save the movement route information with the requested video to effectively generate the overlay.

Advertising information synchronizer module 230 may receive the advertising information overlay generated by the advertising information generator module 220 and transmit the overlay to the advertising information server 120. In addition, the advertising information synchronizer module 230 may synchronize the video played from video player module 210 and the overlay generated from advertising information generator module 220.

The user setup unit module 240 may receive the overlay generated by advertising information generator module 220 and dictates which video consumers will be exposed to the advertising information overlay. In one example, a user may be placed in a user group based on age, gender, location, or advertised product. In other examples, users may be grouped using different criteria. The advertiser may define which groups are exposed to a particular advertising information overlay. In some examples, an advertiser may expose the advertising information to the entire population (all groups).

The message transmitter module 250 may transmit an advertising message containing information pertaining to the advertising information overlay and the visual objects from advertising information server 130 which may effectively add to the advertising information of visual objects of such video. The advertising message transmitted by the message transmitter module 250 may at least include one of the following: video identification information, video display start time, video display run time, website link related to the requested video, advertising information, the requested video's primary scene, or a video scene corresponding to the advertising information.

Figure 3A:
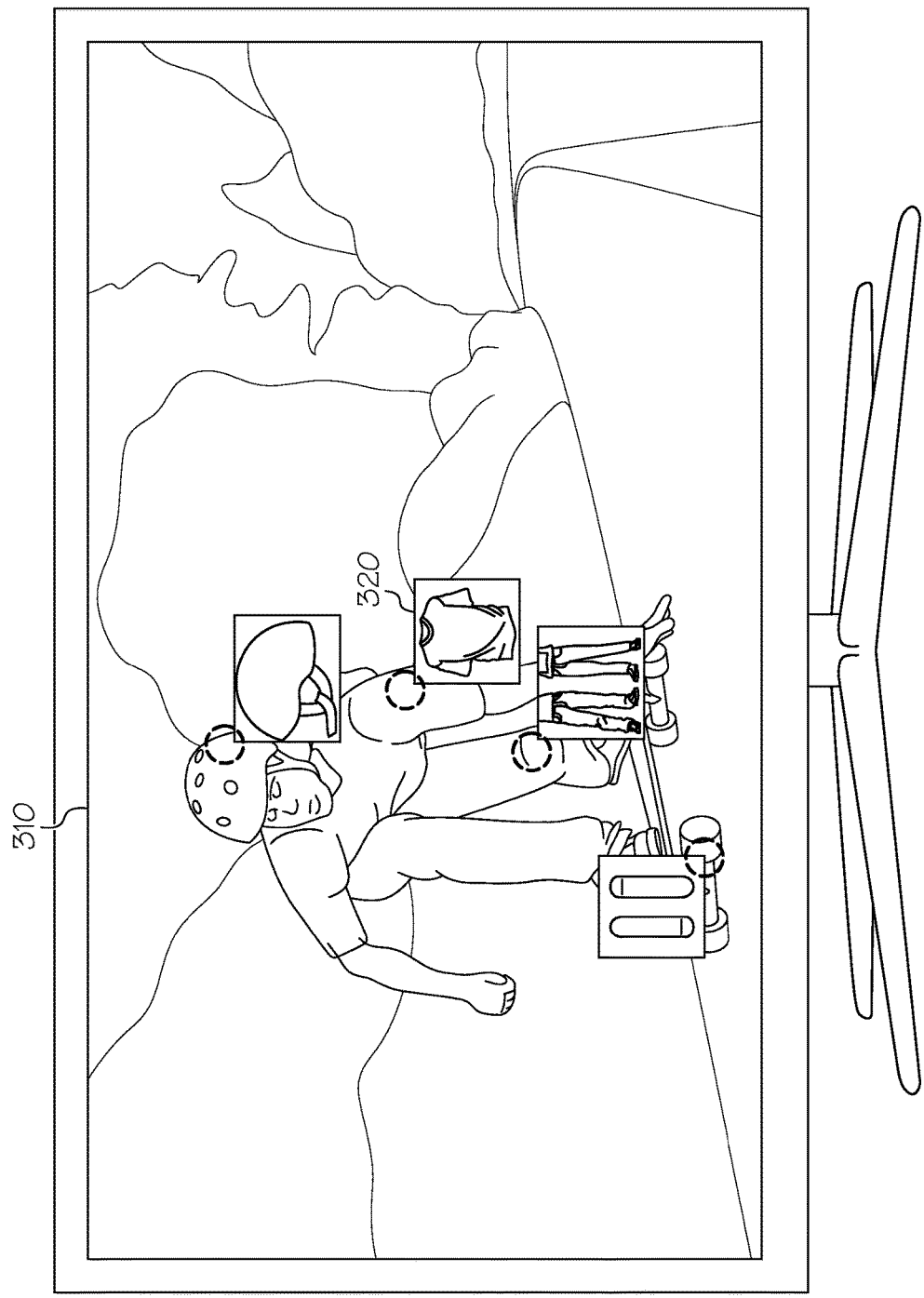

FIGS. 3A-E depict illustrations of advertising information according to embodiments of the present invention. Referring to FIG. 3A, a skateboarder is shown skating down a road. In this example, the advertising information generator module 220 may annotate a requested video 310 by generating one or more advertising information overlays and displaying the overlays on the requested video 310 or a scene in the video. As illustrated in FIG. 3A, the user terminal 140 may display overlays for the different visual objects in the video including the helmet, shirt 320, jeans, and skateboard.

Figure 3B:
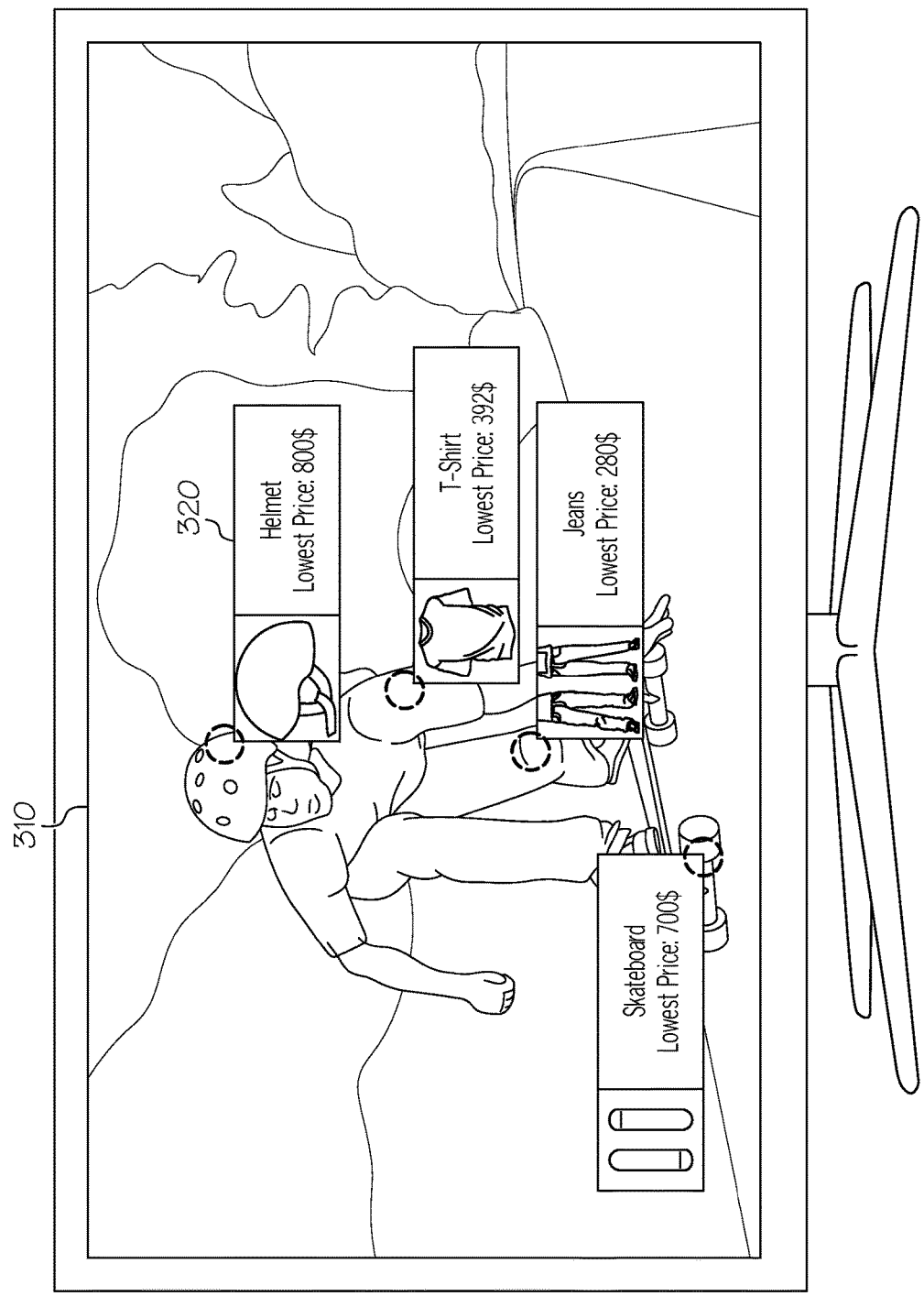

FIG. 3B shows a second example involving the skateboarder. In this example, the advertising information generator module 220 may annotate a requested video 310 by generating one or more overlays and displaying the overlay onto the corresponding visual objects in the requested video 310. Again, overlays are generated for the different visual objects in the video 310 including the helmet 320, shirt, jeans, and skateboard. Overlay 320 corresponds to the helmet. Each overlay shown in FIG. 3B provides additional information to the user including a product name, photograph, and a lowest price. As illustrated in FIG. 3A, the user terminal 140 may display each overlay (including overlay 320) at a location near the visual object that is associated with the overlay.

As the skateboarder moves down the street, the position of the skateboarder (and the visual objects such as the helmet, shirt, jeans, and skateboard) on the user terminal will change. As the requested video 310 plays, the advertising information generator module 220 may track the movements of one or more visual objects within the requested video 310 and, according to the movements, may move the display location of each overlay based on the location of its corresponding visual object.

The advertising information generator module 220 may generate overlay 320 that is displayed onto a visual object in the requested video 310 based on advertising display criteria. As shown in FIG. 3C, the user terminal 140 only displays the overlay 320 on the requested video 310 when the user selects (e.g., by a mouse click) the visual object 330. The advertising information generator module 220 only displays the overlay 320 when the user requests it by selecting the visual object 330, resulting in an advertising cost saving scheme where only interested parties are exposed to the advertising information, blocking off non-interested parties from viewing the advertisement. As shown in FIG. 3C, when the user clicks on the helmet (i.e., visual object 330), the overlay 320 is displayed showing the product name, a photograph of the product, and a lowest price found for the product.

Figure 3D:
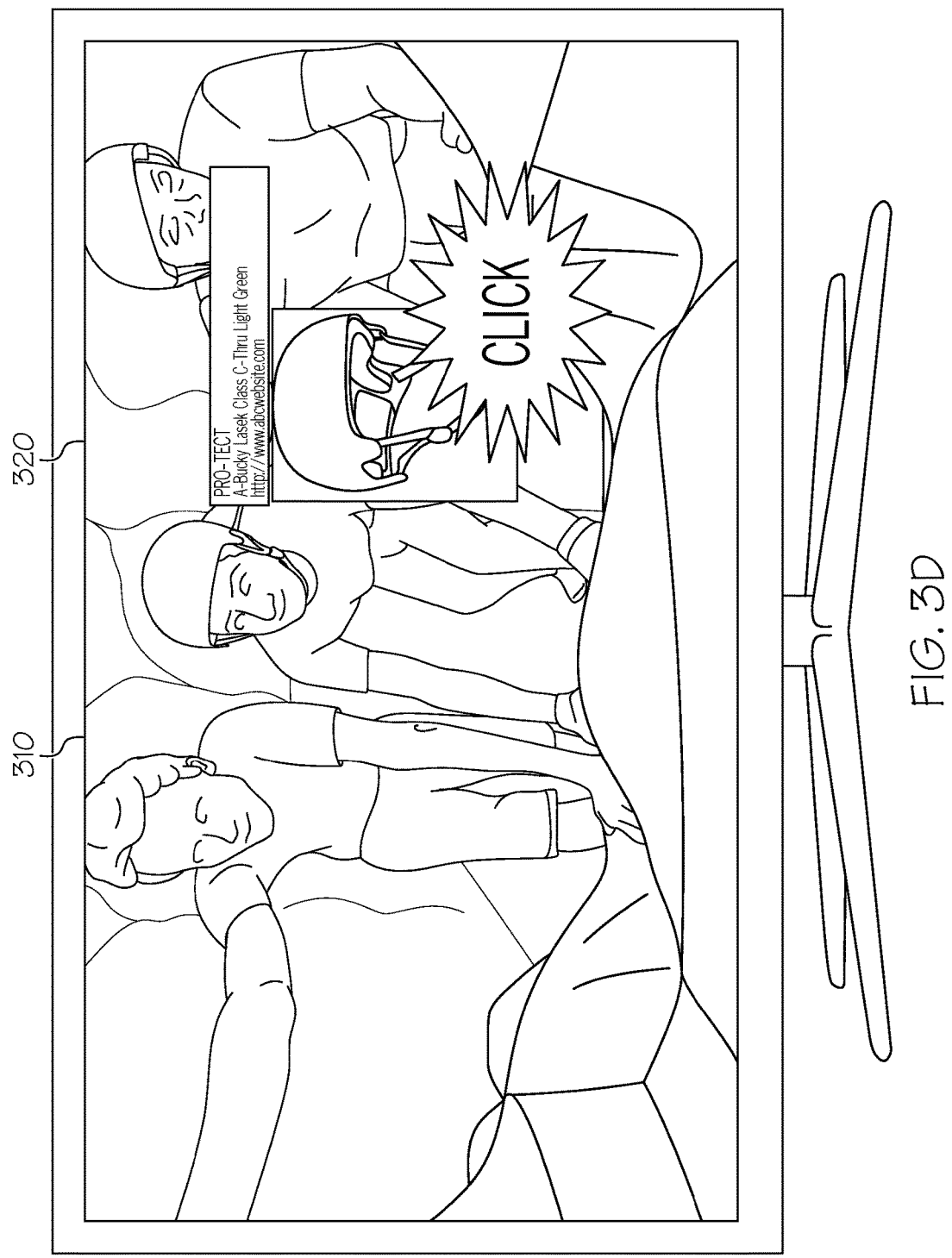

As shown in FIG. 3D, the advertising information generator module 200 may determine a specific location to display the advertising information among the visual objects included in the video 310. The advertising information generator module 220 may generate overlay 320 relating to a helmet to be displayed near the location of the visual object (middle person's helmet in video 310). The overlay 320 is generated when the user selects (e.g., by a mouse click) the visual object 330. The overlay 320 provides the user with additional advertising information for the helmet.

Figure 3E:
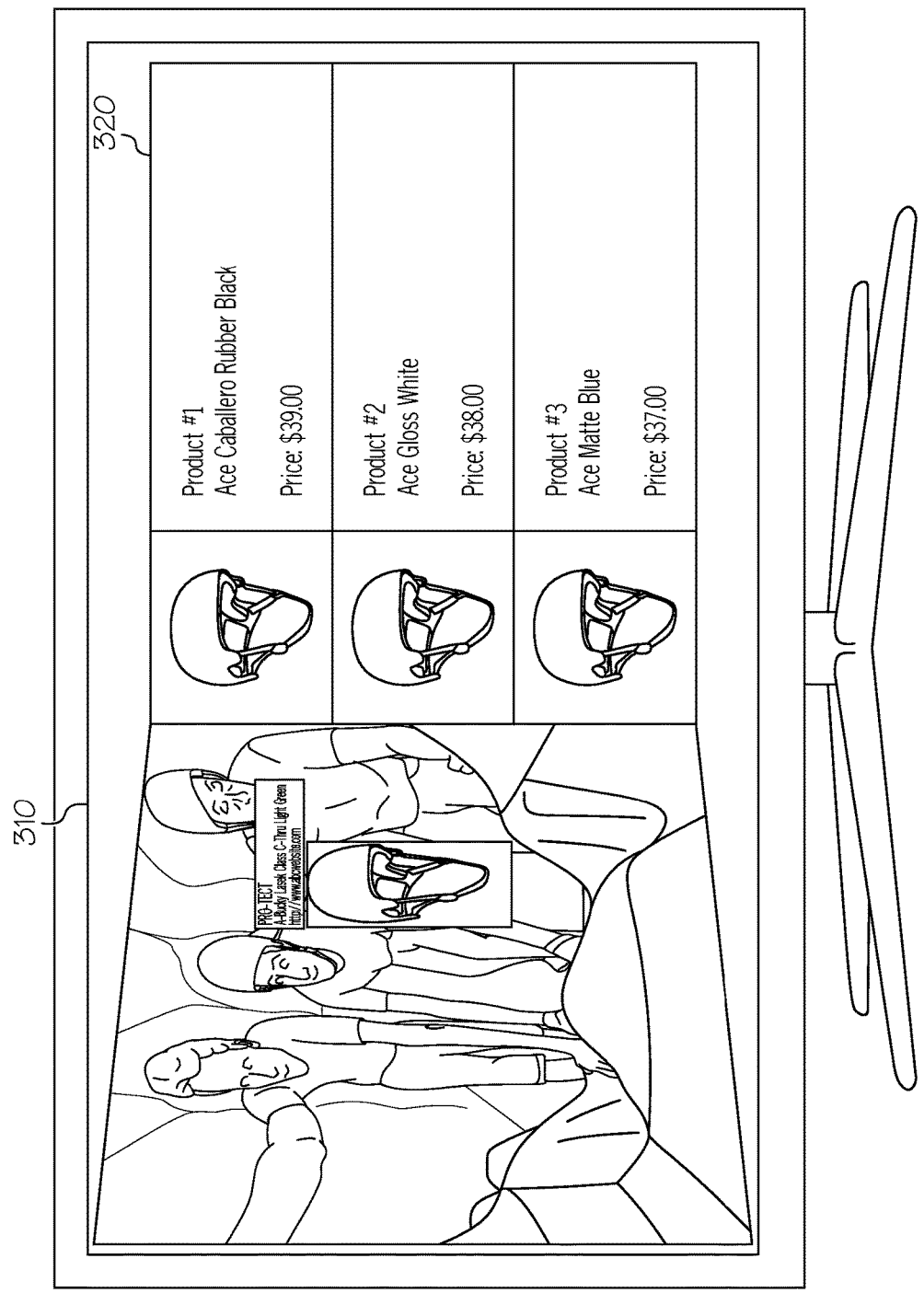

In the example shown in FIG. 3E, the advertising information generator module 220 may display overlay 320 associated with the requested video 310. However, unlike the preceding examples, the overlay 320 does not overlap onto the requested video 310. As shown FIG. 3E, the user terminal 140 divides the screen where requested video 310 is being displayed and displays the overlay 320 on a divided screen, not allowing the overlay 320 to get in the way of the requested video 310.

Figure 4:
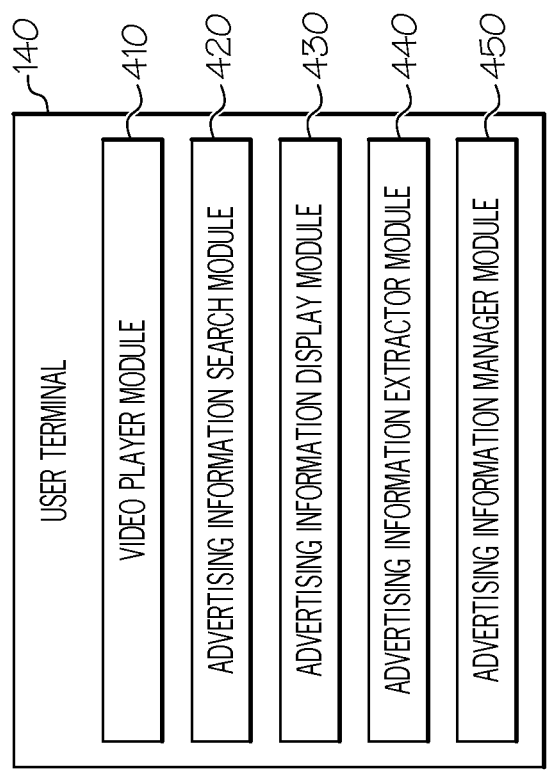
FIG. 4 depicts a schematic of a user terminal according to an embodiment of the present invention.

FIG. 4 depicts a schematic of a user terminal according to an embodiment of the present invention. As shown, user terminal 140 includes video player module 410, advertising information search module 420, advertising information display module 430, advertising information extraction module 440, and advertising information manager module 450. The advertising information manager module manages the overlay and the retrieved video as a composite.

The video player module 410 may display video according to a user request. Specifically, the video player module 410 may receive data pertaining to a video title or other video search criteria according to the user request from a user. Subsequently, by using the data received, the video player module 410 may then search for the requested video from the video server 120. After the requested video is found, the video player module 410 may then play the requested video from the video server 120 by downloading it or streaming it live.

In one example, the video player module 410 may search and play a requested video from the video server 120 when the user terminal 140 recognizes a video being played by another terminal by using camera-like technology.

The advertising information search module 420 may search for the advertising information overlay (overlay) related to the requested video being played by the video player module 410 from the advertising information server 130. The overlay may include at least one of the following: advertising information related to a product, data related to a visual object associated with the overlay, overlay display time, overlay display location, and/or other overlay display criteria. Moreover, the advertising information search module 420, by using camera-like technology of user the terminal 140, may recognize a video being played by another terminal and search for an overlay related to that video.

Once the advertising information search module 420 looks up the overlay, the advertising information display module 430 may display the searched overlay with the requested video being played by video player module 410. For example, the advertising information display module 430 may display the overlay by overlapping it onto the requested video.

In one example, the advertising information display module 430, by utilizing advertising information transmitted from the advertising information server, may determine a visual object in the video frame having a corresponding overlay, and may then display the overlay.

In another example, when the user selects a visual object in the video, the advertising information display module 430 may determine the overlay associated with the visual object. Once the overlay related to the particular object is confirmed, the overlay may be displayed. For example, when advertising display criteria is "only when user selects object", the advertising information display module 430 may wait until the user selects the object having a corresponding overlay. Only then, when the user selects such the object, will the advertising information display module 430 display the overlay related to the object.

When the user terminal 140 recognizes video being played by another terminal using camera technology, the advertising information display module 430 may display (along with the video from video player module 410) the overlay searched by the advertising information search module 420. In other words, the advertising information display module 430 may display the overlay with the video even when the user terminal 140 recognizes a video with no advertising information being displayed. For example, when the user watches a video with a terminal (such as a smart TV) that recognizes an object of interest, the user terminal 140 may recognize the video and display the overlay related to the object (along with the video itself) on the user terminal 140. As such, users may access advertising information on the object without further search efforts.

The advertising information extraction module 440 may receive a message from the advertising information display module 430 and extract an overlay and video information from the message. The video information may include at least one of the following: video identification information, video display time, video run time, a website link related to the video, the video's primary scene, and the scene related to the overlay. The advertising information display module 430 may display the primary scene or scene related to the advertising information extracted from extraction module 440 along with the overlay. Moreover, the video player module 410 may play the video using the video information extracted by advertising information extraction module 440.

The advertising information management module 450 may save and manage the advertising information transmitted from advertising information extractor module 440 and video from video server 120 as a composite. At this time, the video player module 410 may confirm the existence of the user requested video in advertising information management module (management module) 450. Once the video exists in the management module 450, the video player module 410 may play the video stored in the management module 450. The video being played is already composed with the overlay, so that no operation from advertising information display module 430 is needed. The user is provided with the requested video along with the overlay.

The user terminal 140 is largely divided into video player module 410 and advertising information management module 450. If the video requested from the user is already stored in the management module 450, the user terminal 140 may provide the user with the requested video with the overlay. If the requested video is not stored in the advertising information management module 450, the user terminal 140 searches for the video from video server 120 to provide to the user.

Figure 5:
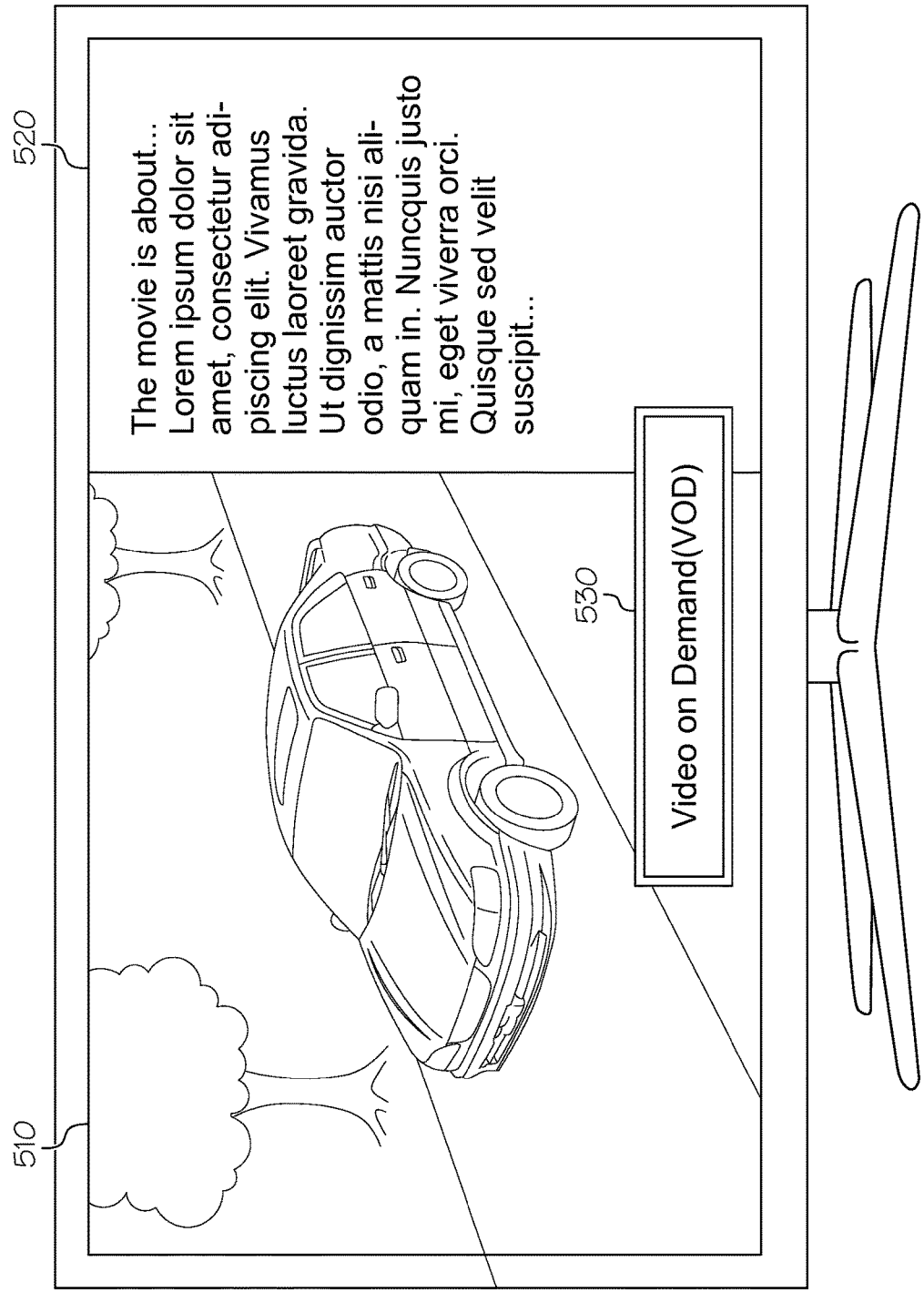
FIG. 5 depicts an illustration of a user terminal message according to an embodiment of the present invention.

FIG. 5 depicts an illustration of a user terminal message according to an embodiment of the present invention. The user terminal 140 may display the message sent from advertiser terminal 110 to the user. Using the message sent from the advertiser terminal 110, the user terminal 140 may display the video's primary scene or scene 510 relating to the overlay or the overlay 520 as well as a video play icon 530. The video play icon 530 is shown with label "Video on Demand (VOD)". At this time, the user may conveniently recognize the image related to overlay 520 through the primary scene or scene 510 relating to the overlay. Moreover, when the user selects the video play icon 530, the user terminal 140 may play the video according to the video information transmitted from the message of advertiser terminal 110.

For example, the user terminal 140 may search for a requested video from video server 120 using video identification information and, based on the video's start and finish times, play the searched video. Moreover, the user terminal 140 may, using the website address related to the video, log into the website and display the video played in the website.

Figure 6A:
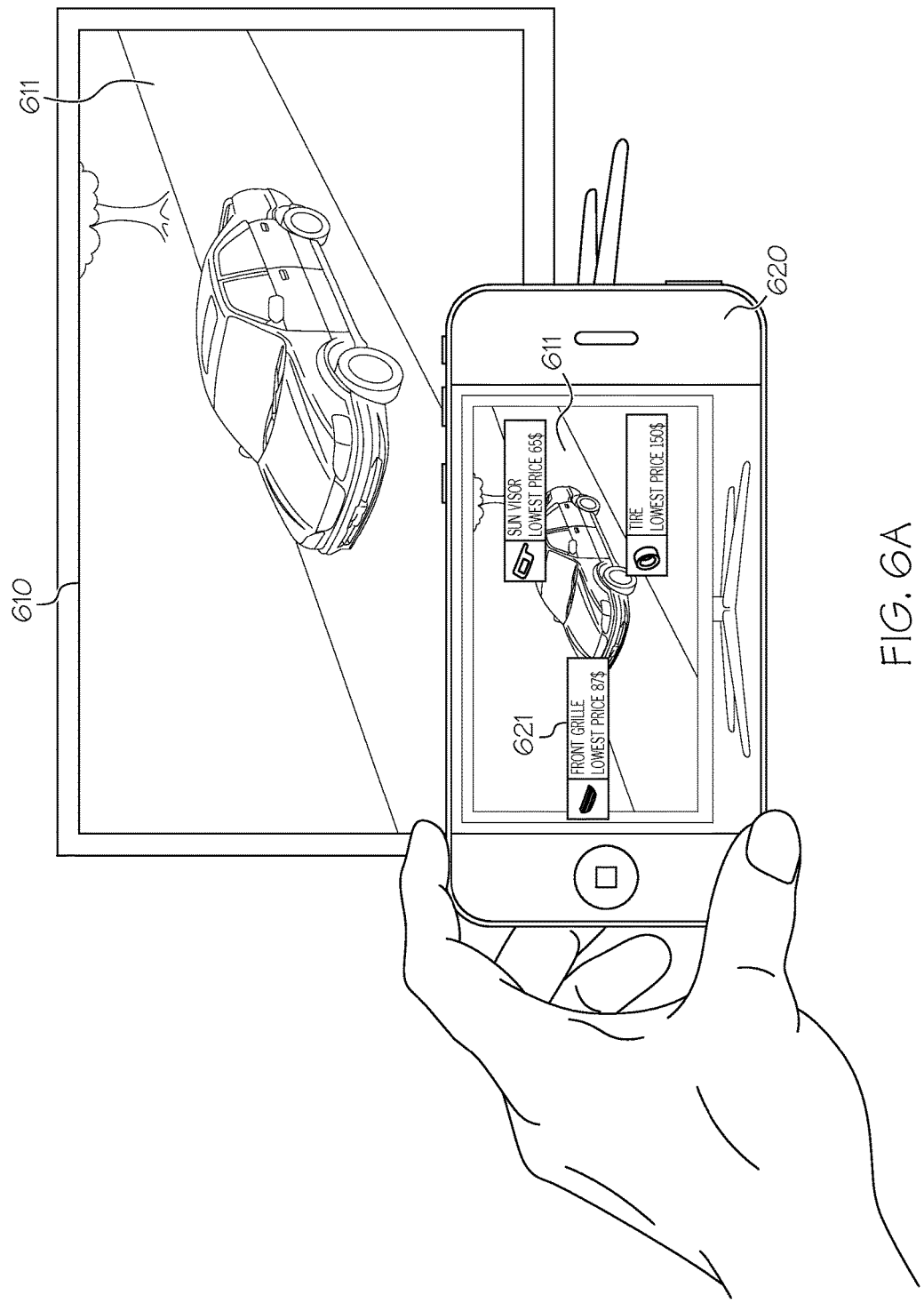
FIGS. 6A and 6B depict illustrations of a user terminal recognizing a video being played by another terminal according to an embodiment of the present invention.
Figure 6B:
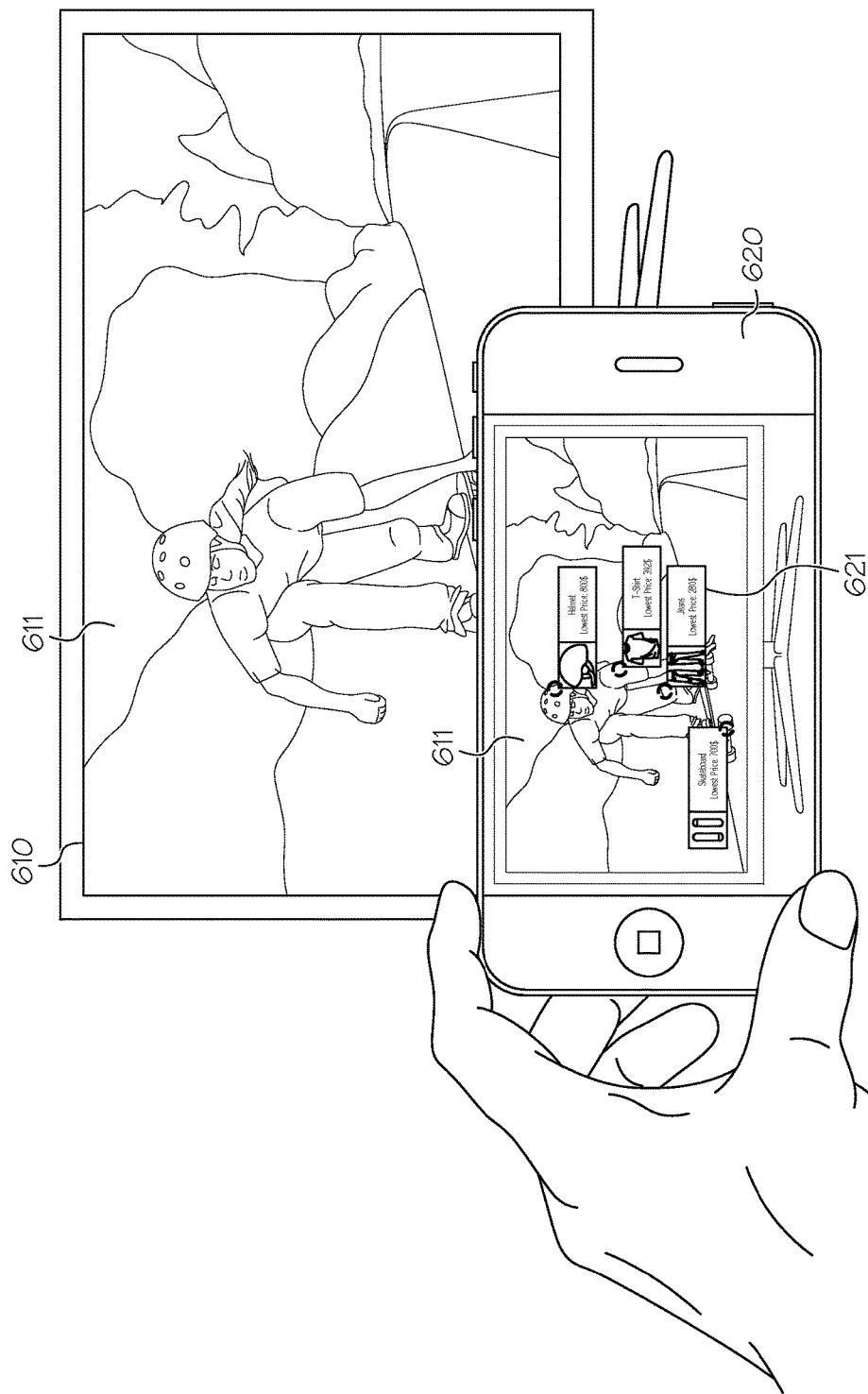

FIGS. 6A and 6B depict illustrations of a user terminal recognizing a video being played by another terminal according to an embodiment of the present invention. As shown in FIG. 6A, the advertiser terminal 110 may dictate the advertising exposure based on the terminal type. For example, the advertiser terminal 110 may set up advertising exposure in a way to block advertising information on big screens (such as smart TV 610) and only allow such advertising on portable devices (such as smart phone 620). A skateboarder video is shown in FIG. 6B. The same video 611 is displayed simultaneously on smart TV 610 and smart phone 620. The jeans 621 of the skateboarder represent one virtual object being annotated with advertising information. The advertising information may be any multimedia data including audio, data, video or any combination thereof. In one example, the annotation or overlay (i.e., the advertising information) may be in the form of (among other things) text, video, one or more images, music, a web object, one or more three-dimensional (3D) objects or images, and/or 3D animation. Alternatively or in addition, the annotation may include multimedia data from another person (such as a friend) including an image, video, audio, email message, voice mail message, text message, and/or instant message. The examples described above or exemplary only and not intended to be limiting. Other examples of multimedia data may be displayed as advertising information.

Figure 7:
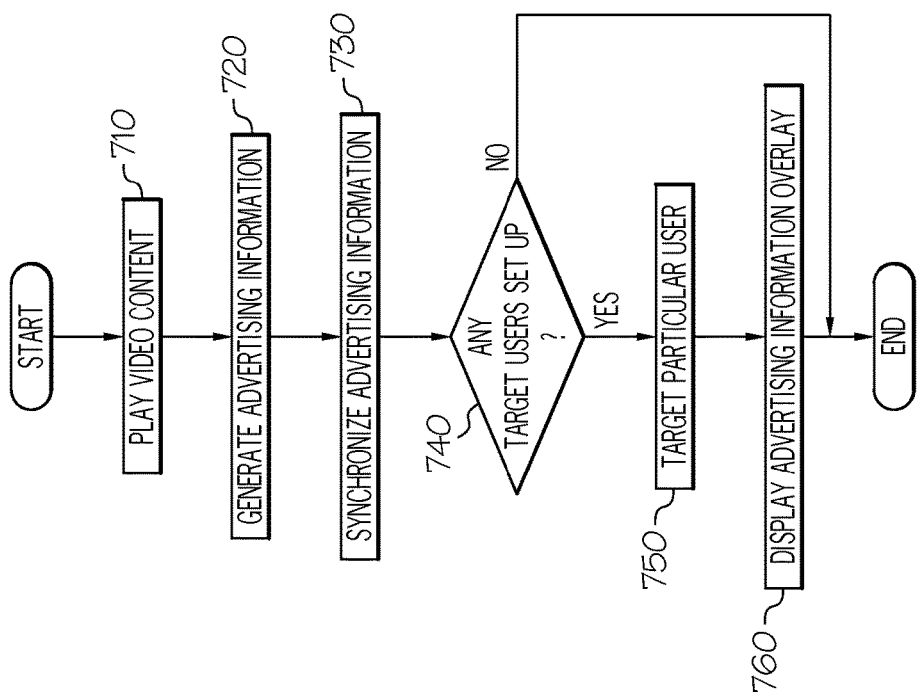
FIG. 7 depicts a method flow diagram of a process for generating advertising information according to an embodiment of the present invention.

FIG. 7 depicts a method flow diagram of a process for generating advertising information according to an embodiment of the present invention. At step 710, the video player module 210 may search for an advertiser requested video from video server and play it. At step 720, the advertising information generator module 220, according to advertiser's input data, may generate an advertising information overlay related to the video played in step 710.

In one example, the advertising information generator module 220 may generate annotated video or a particular scene with the generated overlay. In another example, the advertising information generator module 220 may generate an overlay base on one or more visual objects included in the video. The advertising information generator module 220 may then transmit the overlay to advertising information server 120. At step 730, the advertising information synchronizer module 230 takes video from step 710 and advertising information from step 720 and synchronizes (by overlapping or other means) them. At step 740, it may be determined whether one or more users (or groups of users) have been defined who may be exposed to the overlay generated in step 720. If the advertiser does not set up one or more targeted users or user groups, the generated overlay may be available to all users.

At step 750, the advertiser may use user set up module 240 to define one or more users (or groups of users) who may be exposed to the overlay generated in step 720. At step 760, the message transmitter module 250 may transmit a message which may include advertising information, visual object information, and target user information from step 750 to advertising information server 130.

FIG. 8 depicts a method flow diagram of a process for generating advertising information according to an embodiment of the present invention. At step 810, the advertising information extraction module 440 may confirm the message transmission from the advertising information server 130. If there is no message transmission from advertising information server 130, the advertising information extraction module 440 may wait until a message is transmitted. When a message is confirmed, the video player module 410 may be activated.

If there is message transmission at step 810, the advertising information extraction 250 may execute step 840. At step 820, the video player module 410 may display video according to a user request. The video player module 210 may receive data pertaining to video title and/or other search criteria from the user. Using the data received, the video player module 210 may then search for the requested video corresponding to a user request in the video server 120. Next, the video player module 210 may either download or stream live the requested video in order to play the video from video server 120.

At step 830, the advertising information search module 420 may search for an advertising information overlay relating to the requested video being played in step 820 from the advertising information server 130. If no overlay is found, no further action is required until the video from step 820 is finished playing.

At step 840, the advertising information extraction module 440 may extract a searched overlay and video information from the message transmitted at step 810. The video information may include at least one of the following: video identification information, video display start time, video display finish time, website relating to video, primary scene in video, and scene relating to advertising information.

At step 850, the advertising information display module 430 may display the extracted overlay from step 840 to the advertiser. At this time, the advertising information display module 430 may display a primary scene in the video, a scene relating to the overlay, and the overlay, as well as a video play icon.

Moreover, the advertising information display module 430 may also display searched overlay from step 830 with the video being played at step 820. For example, the advertising information display module 430 may play the video in which the overlay related to the video is overlapped with the video itself. At step 860, the advertising information display module 430 may confirm the advertiser selected message from step 850 which includes the overlay and the video play icon. If the advertiser does not select the overlay or the video play icon as noted in the message at step 850, the advertising information display module 430 may terminate further action.

On the other hand, if the advertiser selects the overlay or the video play icon from step 850, the advertising information display module 430 may activate the video player module 410 to execute step 870. At step 870, the video player module 410 searches for the video from video server 120 which corresponds to the video information extracted from step 840 and then play it.

It should be noted that, in the method flow diagrams of FIGS. 4 and 5 described herein, some steps can be added, some steps may be omitted, the order of the steps may be rearranged, and/or some steps may be performed simultaneously.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A system for displaying a video augmented with advertisement information, comprising:
    an advertiser device comprising one or more processors, memory, and a set of instructions that cause the one or more processors to perform the following:
        generate an advertising information overlay based on display data from an advertiser comprising product information and an identification of one or more visual objects which, when the advertising information overlay is imposed over a displayed video comprising a visual object of the one or more visual objects, the advertising information overlay tracks with from one frame of the displayed video to a second frame of the displayed video;
        receive a request for a video from a display device;
        determine whether an object visually displayed within the requested video is one of the identified visual objects of the generated advertising information overlay;
        capture, in response to a positive determination, a movement route of the visually displayed object within the requested video by sampling frames of the requested video;
        configure, in response to the positive determination, the advertising information overlay to track with the captured movement route of the visually displayed object in the requested video; and
        transmit the requested video and, in response to the positive determination, the configured overlay to the display device;
    the display device comprising a display, one or more processors, memory, and a set of instructions that cause the one or more processors to perform the following:
        play the requested video on the display;
        receive a request from a user to transmit the playing the requested video to a personal device associated with the user;
        determine, based on an identity of the user, whether the user is in a target user group;
        apply, in response to a determination that the user is in the target user group, the advertising information overlay comprising the product information to the video; and
        transmit, in response to the user request, the video to the personal device, wherein the advertising information overlay is transmitted with the video in the case that the user is in the target group and wherein the video continues to play on the display; and
    the personal device, for displaying the video augmented with the advertisement information overlay, comprising one or more processors, memory, a display, and a set of instructions that cause the one or more processors to perform the following:
        receive the video from the display device based on the user request;
        receive, in response to the determination that the user is in the target user group, the advertising information overlay, product information of the advertising information overlay comprising at least one item of information selected from the group consisting of: a product name, a product description, a product advertiser, and a product price, the product information presented as at least one of: text, video, an image, sound, and a three-dimensional (3D) object;
        play, based on the determination that the user is in the target user group, the advertising information overlay with the requested video, wherein the overlay tracks with the visually displayed object from a first location to a second location over a first frame and a second frame of the requested video;
        play, based on a determination that the user is not in the target user group, the requested video absent the advertising information overlay; and
        permit user interaction, through the advertising information overlay displayed on the personal device, between the user and the display device, wherein the display device and the user device simultaneously play the video, by transmitting a user input associated with the object to the display device and, in response, receiving a personalized advertisement, based on at least one of: the user input and a user profile, associated with the advertising information overlay displayed with the requested video, the personal advertisement presenting at least one vendor associated with the object in the video.

2. The personal device of claim 1, the personal device being associated with the user wherein, in response to a selection from the advertising information overlay by the user, the personalized advertisement comprises additional advertising information displayed on the personal device of the user as the requested video is being displayed on the display.

3. The system of claim 1, wherein the advertising information overlay is related to at least one of the requested video, a video scene of the requested video, a video frame of the requested video, or a visual object in the requested video.

4. The display device of claim 1, further comprising an advertising information manager module configured to manage the overlay and the retrieved video as a composite, the managing comprising receiving: video recognition information, a video start time, a video run time, a website address related to the advertising information overlay, advertising information, and a scene relating to the advertising information overlay.

5. The personal device of claim 1, further comprising a video player module configured to display the requested video on the display.

6. The personal device of claim 1, the receiving of the advertising information overlay further comprising searching the display device for an advertised information overlay based on at least one of the requested video, a video scene of the requested video, a video frame of the requested video, or a visual object in the requested video.

7. The display device of claim 1, wherein the advertising information overlay includes at least one of advertising information related to a product, data related to a visual object associated with the overlay, overlay display time, overlay display location, or overlay display criteria.

8. The display device of claim 1, the set of instructions further causing the one or more processors to:
   determine the presence and location of a visual object within a frame of the requested video based on an appearance of the visual object within the frame;
   identify the visual object as being associated with the advertising information overlay; and
   display the advertising information overlay based on the location of the visual object.

9. The personal device of claim 1, the set of instructions further causing the one or more processors to receive a message from the display device and extract the advertising information overlay and video information from the message.

10. The personal device of claim 9, the receiving of the video further comprising displaying the requested video based on the video information.

11. The display device of claim 1, the set of instructions further causing the one or more processors to generate the advertising information overlay and synchronize the advertising information overlay and the requested video.

12. The display device of claim 1, the set of instructions further causing the one or more processors to define the target user group, wherein the advertising information overlay is displayed when the user is a member of the target user group.

13. The personal device of claim 9, the set of instructions further causing the one or more processors to transmit the message to the display device.

14. A method for displaying a video augmented with advertisement information on a personal device, comprising:
   generating an advertising information overlay based on display data from an advertiser comprising product information and an identification of one or more visual objects which, when the advertising information overlay is imposed over a displayed video comprising a visual object of the one or more visual objects, the advertising information overlay tracks with from one frame of the displayed video to a second frame of the displayed video;
   receiving a request for a video from a display device;
   determining whether an object visually displayed within the requested video is one of the identified visual objects of the generated advertising information overlay;
   capturing, in response to a positive determination, a movement route of the visually displayed object within the requested video by sampling frames of the requested video;
   configuring, in response to the positive determination, the advertising information overlay to track with the captured movement route of the visually displayed object in the requested video; and
   transmitting the requested video and, in response to the positive determination, the configured overlay to the display device;
   receiving a user request from a personal device associated with the user for the requested video playing on the display device;
   determining, based on an identity of the user associated with the personal device, whether the user issuing the user request is in a target user group;
   apply, in response to a determination that the user is in the target user group, the advertising information overlay to the video, wherein the overlay comprises the product information comprising at least one of: a product name, a product description, a product advertiser, and a product price, the product information presented as at least one of: text, video, an image, sound, and a three-dimensional (3D) object;
   transmitting, in response to the user request, the video to the personal device, wherein the advertising information overlay is transmitted with the video in the case that the user is in the target group and wherein the video continues to play on the display;
   playing, at the personal device, based on the determination that the user is in the target user group, the advertising information overlay with the requested video on a display of the personal device, wherein the overlay tracks with the visually displayed object from a first location to a second location over a first frame and a second frame of the requested video;
   playing, at the personal device, based on a determination that the user is not in the target user group, the requested video absent the advertising information overlay; and
   permitting user interaction through the advertising information overlay displayed on the personal device, between the user and the display device, wherein the display device and the user device simultaneously play the video, by transmitting a user input associated with the object to the display device and, in response, receiving a personalized advertisement, based on at least one of: the user input and a user profile, associated with the advertising information overlay displayed with the requested video, the personal advertisement presenting at least one vendor associated with the object in the video.

15. The method of claim 14, the personal device being associated with the user, further comprising displaying, in response to a selection from the advertising information overlay by the user, the personalized advertisement comprising additional advertising information on a personal device of the user as the requested video is being displayed on the display.

16. The method of claim 14, further comprising:
   identifying an object within a frame of the requested video based on an appearance of the object within the frame;
   identifying the object as being associated with the advertising information overlay; and
   displaying the advertising information overlay based on the identification.

17. The method of claim 14, further comprising selecting a visual object in the requested video, confirming the visual object is associated with the advertising information overlay and object, and displaying the advertising information overlay based on the confirmation.

18. The method of claim 14, further comprising generating the advertising information overlay and synchronizing the advertising information overlay with the requested video, the synchronizing comprising receiving: video recognition information, a video start time, a video run time, a website address related to the advertising information overlay, advertising information, and a scene relating to the advertising information overlay.

19. The method of claim 14, further comprising defining a target user group and displaying the advertising information overlay when the user is a member of the target user group.

20. The method of claim 16, further comprising determining a first location of the object, displaying the advertising information overlay based on the first location, determining a second location of the object when the object moves, and displaying the advertising information overlay based on the second location.

* * * * *